United States Patent [19]

Terry

[11] Patent Number: 5,215,113

[45] Date of Patent: Jun. 1, 1993

[54] PRECISION SAFETY SHUT-OFF VALVE

[76] Inventor: Paul E. Terry, 23844 Via Jacara, Valencia, Calif. 91355

[21] Appl. No.: 966,595

[22] Filed: Oct. 26, 1992

Related U.S. Application Data

[63] Continuation of Ser. No. 718,183, Jun. 20, 1991, abandoned.

[51] Int. Cl.⁵ .............................................. F16K 17/24
[52] U.S. Cl. ...................................... 137/460; 137/517
[58] Field of Search ................ 137/460, 504, 517, 498

[56] References Cited

U.S. PATENT DOCUMENTS

| | | | |
|---|---|---|---|
| 805,498 | 11/1905 | Steward | 137/517 |
| 806,268 | 12/1905 | Koontz | 137/599.1 |
| 1,186,147 | 6/1916 | Syakas | 137/462 |
| 2,093,015 | 10/1935 | Madden | 303/84 |
| 2,121,936 | 6/1938 | Thomas | 137/153 |
| 2,699,799 | 1/1955 | Wager | 137/498 |
| 3,106,937 | 10/1963 | Sands | 137/613 |
| 3,216,451 | 11/1965 | Smallpiece | 137/517 X |
| 3,377,109 | 4/1968 | Scott | 303/84 |
| 4,049,016 | 9/1977 | Henry | 137/498 |
| 4,456,029 | 6/1984 | McCrum | 137/517 X |
| 4,830,046 | 5/1989 | Holt | 137/460 |
| 4,880,030 | 11/1989 | Terry | 137/460 |

FOREIGN PATENT DOCUMENTS 177448 12/1961 Finland .
2450407 9/1980 France .

Primary Examiner—Stephen M. Hepperle
Attorney, Agent, or Firm—Andrew Jordan

[57] ABSTRACT

A fluid control device for hydraulic systems is provided having closure means movably positioned within a valve housing and adapted to selectively close a fluid passageway in response to a predetermined pressure level. The closure means includes a piston body slidably located in the valve housing for reciprocating movement therein and a spring adapted to bias the piston body away from a shoulder to maintain the fluid passageway open during normal operation. The piston body includes a conical nose and a plurality of flow channels (or apertures) which allow fluid to pass through the piston body during normal flow. When the fluid pressure is large, indicating a downstream break or leak in the flow line, the fluid pressure will overcome the force exerted by the spring and force the piston body against the shoulder, thereby blocking the flow pathway and stopping flow through the device.

18 Claims, 1 Drawing Sheet

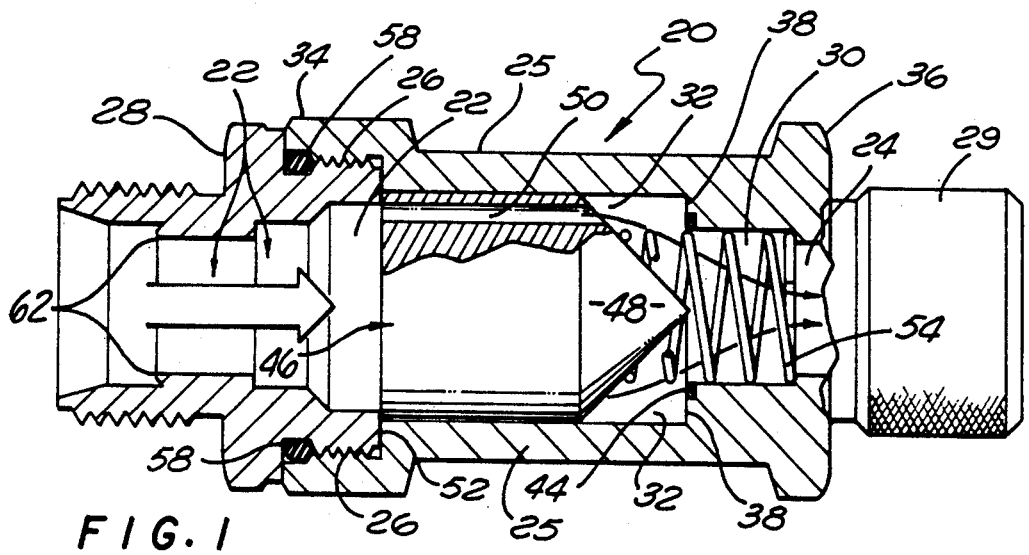
FIG. 1
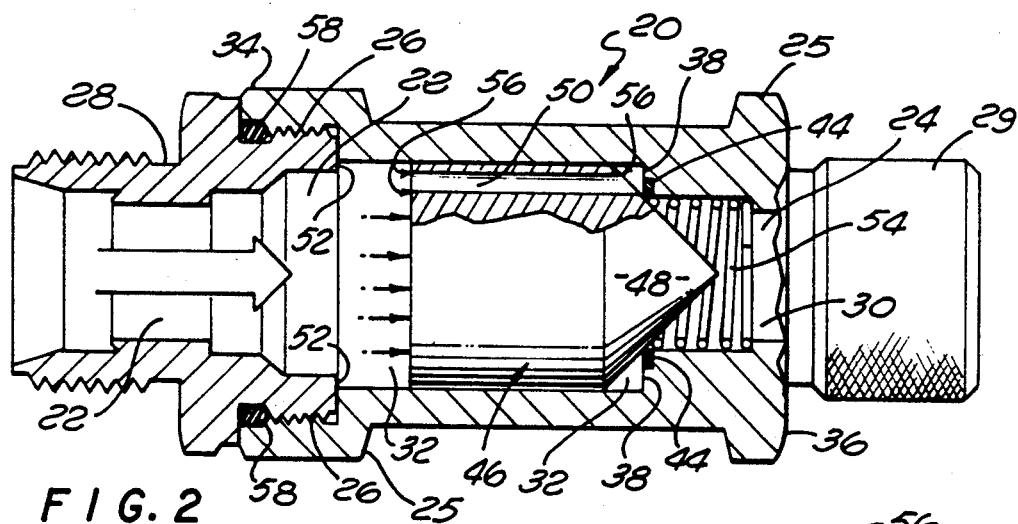
FIG. 2
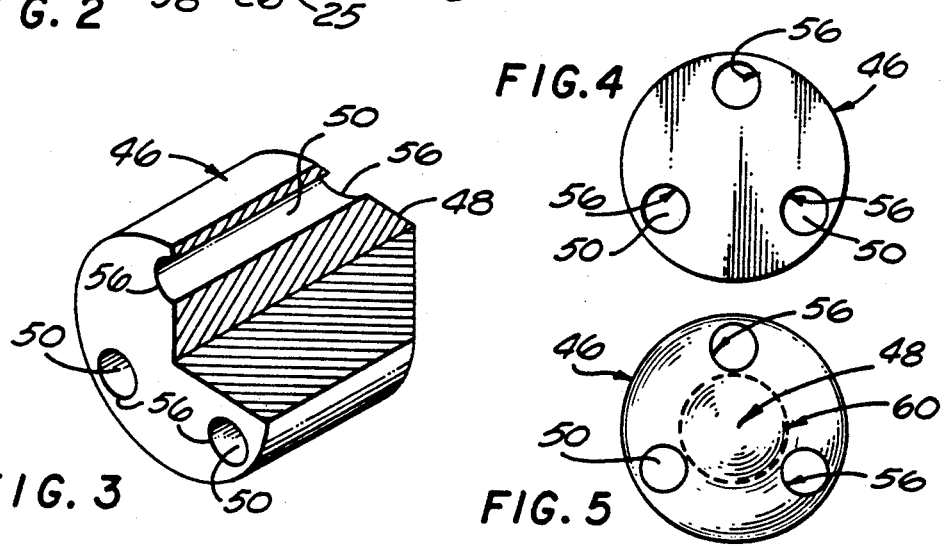
FIG. 3
FIG. 4
FIG. 5

PRECISION SAFETY SHUT-OFF VALVE

This application is a continuation of application Ser. No. 07/718,183, filed Jun. 20, 1991 now abandoned.

BACKGROUND OF THE INVENTION

This invention relates generally to a safety shut-off valve which cuts off flow automatically in response to a leak or break in a flow line. More particularly, the present invention relates to a safety shut-off valve particularly useful in hydraulic lines wherein a rupture of any of the liquid-containing lines is apt to disable the entire hydraulic system and may result in serious consequences. The present invention responds to an abnormal flow condition downstream in a hydraulic line and advantageously, seals off flow so that a ruptured part does not disable the entire system.

A ruptured hydraulic line has previously proven fatal by triggering various past airplane crashes attributable to hydraulic pressure loss. For this reason, a safety shut-off valve for use in hydraulic lines is especially important. As will be known by those skilled in the art, there exist a number of devices which are designed to control flow, and to act as a shutoff in the event of a leak. These devices generally fall into two major categories, namely the shock operated type and the flow or pressure operated type. The shock operated device is designed to operate to shut off flow in the event of a major shock, such as that of an earthquake or the like. Examples of such devices are found in U.S. Pat. No. 3,747,616, to Lloyd, in U.S. Pat. No. 3,768,497, to Mueller, in U.S. Pat. No. 4,091,831, to Pazmany, in U.S. Pat. No. 4,336,818, to Dauvergne, and in U.S. Pat. No. 4,485,832, to Plemmons et al. These devices are all designed for use with gas lines, and do not address the problem of breaks or leaks in the line downstream of the devices.

The second approach, which causes a shutoff of flow in the event of an overly large flow rate or an excess pressure drop across the device is illustrated, for example, by U.S. Pat. No. 2,659,383 to Frager, U.S. Pat. No. 4,522,229 to Van de Moortele, U.S. Pat. No. 4,665,932, to Quenin. All three of these devices are designed primarily for industrial applications, and are large, complex, and expensive, and therefore, are less than ideal. Prior art that is exemplary of the second approach generally requires undesirable complex utilization of a multitude of moving parts. Moreover, many prior flow control devices are not designed to be responsive to the situation contemplated by the present invention, namely a leak in downstream plumbing.

The second approach, i.e. causing a shutoff of flow in the event of an overly large flow rate, was the basis for Applicant's previously patented fluid shutoff device, Pat. No. 4,880,030, issued Nov. 14, 1989 and titled "Safety Flow Control Fluid Shutoff Device."

The main causes of leakage are ruptured pipes, tubes or fittings; supply lines and other flow promoting equipment; rusty or aging components, poor installation practices, poor quality materials, and pressure surges. With so many different factors that can create in-line failures and runaway leaks, one can readily realize the need for a fluid shutoff safety device. This need is accentuated considering the massive difficulties that ensue in the wake of a failure involving a hydraulic line which provides hydraulic power in aircraft.

The vast array of prior flow control devices prohibits a detailed listing of the many problems associated with the various types of previous flow shut-off inventions. Noteworthy are those prior problems which the present invention is directed towards addressing. One such prior art drawback is evident in the general type of shut-off valves that characteristically execute flow stoppage in response to a pressure change in the flow line, rather than providing for flow shut-off at a predetermined, preselected pressure. There is, therefore, a significant need, especially for application in hydraulic systems, for an improved shut-off valve that can be relied upon to execute flow stoppage at a predetermined pressure that can be pre-selected during manufacturing of the improved flow control device.

Another drawback associated with some prior flow control devices is that said prior devices disadvantageously have structural or operational characteristics that induce turbulence in the flow stream. Usually, such turbulence undesirably results in pressure loss in the flow system. Exemplary of those elements which promote turbulence in prior flow control devices are the inclusion of complex shaped working components that are less than ideally streamlined, the use of sharp edges on structural features that contact the flow stream, and the practice of inducing sharp changes in the direction of the flow stream. There is needed, therefore, an improved shut-off valve that operates so as to minimize the creation of turbulence in the flow stream, especially while the shut-off valve is operating in an open mode to allow flow to be normally conducted.

Yet another prior art problem is apparent in those previous flow control devices which are generally characterized as ball and check valves. Disadvantageously, many prior shut-off valves are operable only between the extremes of being either completely open (to allow full flow) or completely closed (to prohibit any flow), whereas it would be advantageous to provide an improved shut-off device that could provide a gradual change in flow conditions from zero flow to full flow. The advantage of providing a flow control device operable to allow for gradual change in the flow intensity is that one wishes to avoid shockwaves in the flow system. That is, a prior shutoff valve that abruptly slams shut to execute flow stoppage undesirably unleashes a shock to the flow system which can only have a negative overall impact. In general, it is preferable to avoid an operating action that involves switching abruptly from one extreme (full flow) to the opposite extreme (zero flow) in order to prevent destructive shock to the flow system apparatus. Moreover, an improved flow control device should also address the reverse situation in that the shut-off valve should, preferably, be capable of allowing the flow to be gradually restored from zero flow to full flow following repairs to a damaged flow line. An important factor that is a determinant in whether gradual flow change or abrupt flow change will be achieved is the manner in which a shut-off valve employs its closure member to effect flow stoppage and flow resumption, specifically the seating (or closure) action of the closure member.

In addition to the need for an improved flow control device which addresses the afore-mentioned concerns, it is desirable that such an improved shut-off valve advantageously should stay closed to prevent flow until any downstream problem in the flow line is finally fixed. The needed shut-off device desirably should have an extended highly reliable operating life, and must operate flawlessly and immediately upon the occurrence of a break or leak in the flow line to shut off the flow before extensive damage occurs. In hydraulic system applications, the needed flow control invention must automatically and immediately execute flow shut-off in order to ensure that hydraulic fluid does not leak out in such a sufficient quantity so as to cause a dramatic loss in hydraulic pressure, and an accompanying dreaded disabling of the hydraulic system (which could prove fatal in aircraft applications). The present invention fulfills these needs and provides further related advantages.

SUMMARY OF THE INVENTION

The needed improvements over prior fluid shutoff devices as discussed above are achieved by the present invention. With this invention, a flow sensitive fluid shut-off device is installed in line, preferably in a hydraulic line, such that fluid (preferably hydraulic fluid) flows therethrough along a flow pathway that consists of a flow inlet port through which fluid enters the invention, a cylindrical valve chamber, and a flow outlet port through which fluid exits the shut-off valve and continues on into the main line. One end of the cylindrical valve chamber adjacent the outlet port extends radially inwardly, creating a washer-shaped sealing shoulder that presents a smooth, flat surface that is oriented substantially perpendicular to, and in opposition to, the direction of flow through the shut-off valve. This surface has its strength and durability augmented by advantageously including a hardened insert which defines a valve seat.

Located in the cylindrical valve chamber is an essentially cylindrical piston valve body, which has in the preferred embodiment three flow channels (preferably apertures) extending longitudinally therethrough closely adjacent the edges of the piston valve body. The piston valve body can also be fluted to provide the flow channels. The piston valve body closely fits in the cylindrical valve chamber, and is free to move in the cylindrical valve chamber in reciprocating fashion. When the piston valve body abuts the washer-shaped sealing shoulder, the three apertures in the piston valve body are no longer in fluid communication with the fluid outlet port. This is because the end of the piston valve body facing the outlet port includes a conical nose segment that seals the outlet port shut when the piston valve body abuts the washer-shaped sealing shoulder.

A spring is used to bias the piston valve body away from the washer-shaped sealing shoulder, thereby creating a flow pathway through the three flow channels in the piston valve body, around the conical nose end of the piston valve body, and through the outlet port. In normal operation, fluid will flow through this flow pathway, and will exit through the shut-off device to return into the regular flow line of a flow system. The fluid pressure and flow are balanced by the spring pressure to keep the flow path open. If flow through the safety device becomes excessive, the pressure across the piston valve body will overcome the spring pressure, and force the piston valve body into contact with the washer-shaped sealing shoulder, thereby stopping flow through the safety device. In this manner, the invention is flow sensitive and will respond to rapid, runaway flow by executing fluid shutoff.

It will thus be appreciated by those skilled in the art that in the event of a break or serious leak in the flow line downstream from the flow control device of the present invention, the piston valve body will move into contact with the washer-shaped sealing shoulder to stop flow through the shut-off device. Advantageously, the only moving parts within the flow pathway are the piston valve body and the spring. By varying the relative size of the piston valve body, the size and number of the flow channels in the piston valve body, and the force of the spring, the operating characteristics of the device may be varied so that the invention may advantageously be manufactured to effect flow shutoff at a preselected, predictable pressure level. If desired, the configuration and positioning of the spring may also be varied to adjust the force exerted by the spring on the piston valve body.

Upon the occurrence of a break or leak in the flow line, the present invention immediately senses the break or leak, and promptly shuts down the flow of fluid. It also needs only two moving elements within the flow pathway to effect shutoff of the system, thereby making the device of the present invention as reliable as possible, with a long life expectancy. Advantageously, the present invention is simple of construction and installation to enable it to be easily and quickly installable into a hydraulic system of any aircraft.

The device of the present invention has a highly reliable operating life, and operates flawlessly immediately upon the occurrence of a break or leak to shut off fluid flow, thereby advantageously preventing extensive loss of hydraulic fluid and the accompanying loss of hydraulic pressure. It overcomes the disadvantages of the art and accomplishes all of the afore-stated advantages and objectives while incurring substantially no disadvantage, and thereby represents a highly desirable improvement in the art.

Other features and advantages of the present invention will become more apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a cross-sectional view illustrating the interior of the shut-off valve as it would be seen if cutaway along a vertical plane through the valve housing of a fluid flow control device embodying the present invention, and showing a spring in place within a cylindrical valve chamber for biasing a piston valve body (in partial cutaway view) away from an outlet port to allow fluid flow (as indicated by arrows) through the device, along a flow path from an inlet port, through the piston body and out the outlet port;

FIG. 2 is a cross-sectional view similar to FIG. 1, illustrating the shut-off valve in shut-off mode, showing the piston valve body sealing the cylindrical valve chamber to prevent flow through the outlet port;

FIG. 3 is a perspective view of a piston valve body for use in the valve housing of FIGS. 1 and 2, with the piston valve body being shown in cutaway to reveal one of three flow channels which extend longitudinally through the piston valve body;

FIG. 4 is a rear elevation view of the piston valve body of FIG. 3, illustrating that three apertures defining the entrances to the three flow channels are equidistantly spaced about the piston valve body; and FIG. 5 is a front elevation view of the piston valve body of FIGS. 3 and 4.

DETAILED DESCRIPTION OF THE PREFERRED EMBODIMENT

As shown in the drawings for purposes of illustration, the present invention resides in a precision safety shut-off valve (FIG. 1) designed to automatically respond to a detected rapid flow increase (such as that accompanying a pipe rupture) by triggering an automatic fluid shutoff, thereby quickly preventing a total loss of hydraulic power when employed to protect a hydraulic system. The inventive shut-off valve advantageously can be manufactured to reliably and predictably effect shut-off at a predetermined preselected pressure. Moreover, the acute sensitivity of the shut-off device to flow increases downstream allows a leak as small as that presented by, for example, a pressurized hole only slightly larger than 1/16 inch in diameter to be detected, with such detection immediately stimulating complete flow stoppage through the flow sensitive safety device of the present invention.

In accordance with the present invention, and as illustrated in FIGS. 1 and 2, a shut-off valve 20 is shown in cross section so that the parts and components thereof are more clearly illustrated. The shut-off valve 20 is provided with a main inlet port 22 and a main outlet port 24 located in opposite ends of a valve housing 25 (shown in cut-away in FIGS. 1 and 2). The valve housing 25 may be comprised of brass or another high strength, corrosion resistant metallic material. The preferred material for fabrication of the valve housing 25 is bronze SAE 43. The inside diameters of the inlet and outlet ports 22 and 24 approximately corresponds in size with the inside diameter of pipe line normally used in the flow system. The main inlet port 22 and the main outlet port 24 both include threaded portions 26 (although only the inlet threads are visible) for coupling the invention in-line. Shown installed in the main inlet port 22 is a threaded coupler 28, and similarly screwed onto the main outlet port 24 is a pipe union, or nipple 29. The coupler 28 seats within the valve housing 25 when in threaded engagement therewith and precisely fits therein so that fluid leakage is completely prevented between the coupler 28 and the valve housing 25. To ensure a liquid tight seal, an o-ring gasket 58 (FIGS. 1 and 2) encircles a portion of the coupler 28 which screws into engagement with the threads 26 in the end 34 of the valve housing 25. The pipe fittings 28 and 29 may be used in some installations, or other fittings well known in the art could also be used, as desired, with the size of the pipe fitting depending upon the flow system in which the precision shut-off device is installed. The inlet port 22 and the outlet port 24 will be in fluid communication with an overall flow path that encompasses the fluid flow system to be protected by the present invention. The threaded coupler 28 is considered to define, in part, the inlet port 22.

Referring next to FIGS. 1 and 2, the interior of the valve housing 25 is illustrated, using cutaway views. A cylindrical bore 30 extends through the housing 25 from an outlet end 36 towards the middle of the valve housing 25, with one end of the cylindrical bore 30 comprising the main outlet port 24. As noted both the main inlet port 22 and the main outlet port 24 are threaded to accept standard pipe fittings (such as the pipe unions 28 and 29 shown in FIGS. 1 and 2).

A cylindrical valve chamber 32 is cast within the housing 25 to extend from a first end 34 of the housing 25 in which the main inlet port 22 is located. The cylindrical chamber 32 extends more than halfway through the housing 25 toward the second end 36 of the housing 25 in which the main outlet port 24 is located. The cylindrical bore 30 and the cylindrical valve chamber 32 are coaxially oriented. The cylindrical bore 30 is concentric with, and in fluid communication with, the largest diameter cylindrical valve chamber 32. An end 38 of the cylindrical valve chamber 32 defines a washer-shaped sealing shoulder 40 whereat the larger diameter valve chamber 32 joins with the smaller diameter cylindrical bore 30. This sealing shoulder 40 presents a relatively flat, smooth surface 42 that is oriented substantially perpendicular to, and in opposition to, the direction of flow (as indicated by arrows) through the shut-off valve 20. The edge of the sealing shoulder 40 is defined by a hardened insert 44 that provides a valve seat strengthened to withstand countless abutments with a piston valve body 46 without erosion or leaks after extended service.

Referring next to FIGS. 3–5, the essentially cylindrical piston valve body 46 is illustrated (shown in cutaway in FIG. 3). One end of the piston valve body 46 has a tapered nose segment 48 extending therefrom, with the shape of the segment in the preferred embodiment being conical. The conical nose segment 48 is substantially coaxial with the cylindrical valve chamber 32. The piston valve body 46 is of a diameter which will closely fit within the cylindrical valve chamber 32 (FIGS. 1 and 2), while remaining free to move in the cylindrical valve chamber 32 in reciprocating fashion. Excluding the conical nose segment 48, the remainder of the piston valve body 46 is of a uniform diameter. The length of the piston valve body 46, i.e. the piston bearing surface, should be at least equal to the diameter of the piston valve body at its midsection. Preferably the piston bearing surface should be equal to a valve that is one and one-half (1½) times as large as the piston diameter (that is, the piston length should be 50% longer than the piston diameter). In the preferred embodiment, the piston valve body 46 is made of titanium or another hard metal. A metallic piston is preferred to avoid any breakdown of shape (deformation) that plastic might undergo in the environment of hydraulic fluid (the preferred application for the present invention).

The pointed end of the conical nose segment 48 is sized to fit within the cylindrical bore 30, and thus ultimately seal off the outlet port 24 of the valve housing 25 when the piston valve body 46 abuts the washer-shaped sealing shoulder 40 (as in FIG. 2). A plurality of substantially parallel tubular flow channels 50 extend longitudinally through the piston valve body 46 closely adjacent to the edges of the piston valve body. The drawings illustrate that, preferably, the flow channels 50 are provided by apertures that pass through the piston valve body 46, however, the piston may be fluted to provide these flow channels, or any other suitable means may be provided for forming passageways to allow fluid to flow through the piston body. One important criteria is that the flow channels 50 should allow flow to follow a straight line path through the piston valve body, without any turbulence-inducing change of direction in the flow pathway defined by each flow channel 50. In the preferred embodiment, there are three flow channels 50 equidistantly spaced around the piston body 46 as seen in FIGS. 3–5. The edges 56 that define the entrance and outlet of the flow channels 50 are, preferably, rounded edges, not sharp, in order to promote flow and avoid turbulence.

The sum of the cross sectional areas of all of the outlets of all of the flow channels 50 must equal a minimum of 10 percent more than the cross sectional area of the outlet port 24. This criteria is calculated using the inside diameter of the outlet port 24. Similarly, the sum of the cross sectional areas of all of the entrance openings to the flow channels 50 must equal a minimum of 10 percent more than the cross sectional area of the inlet port 22, as calculated using the inside diameter of the inlet port at the location indicated in FIG. 1 by bracket 62. The shut-off valve 20 is configured such that the inlet port 22 and the outlet port are equal in cross sectional area, and the flow channels 50 are each of a uniform diameter. The number of flow channels 50 to be provided is based on use and pressure requirements. Although it is within the scope of this invention to provide the piston valve body 46 with flow channels 50 in a quantity other than three, the relationship of the cross sectional areas must be maintained. That is, provision of more or less than three flow channels 50 is permissible, provided that the sum of the cross sectional areas of all the entrance openings to the flow channels equals a minimum of 10% more than the cross sectional area of the inlet port 22, and the sum of the cross sectional areas of all of the outlets of the flow channels 50 equals a minimum of 10% more than the cross sectional area of the outlet port 24. When the flow channels 50 are apertures, as illustrated, and the flow system to be protected is a hydraulic system, the collective multiple aperture diameters equal a minimum of 10% more than the inside diameter of the tubing of the hydraulic system. Note (FIG. 5) that the outlets of the channels 50 are located within perimeter portions of the conical nose segment 48, said perimeter portions being defined as being found on the tapered piston surface, at distances farthest from the apex of the nose segment 48. When the piston valve body 46 abuts the washer-shaped sealing shoulder 40 (achieved in FIG. 2), the outlets of the three flow channels 50 in the piston valve body 46 are not blocked by the washer-shaped sealing shoulder 40, however, flow through the outlet port 24 is still blocked by the piston valve body because its conical nose fills and closes off flow passage through the cylindrical bore 30.

The conical nose segment 48 of the piston valve body 46 is sized so that it will not entirely fit within the cylindrical bore 30 so that the flow channels 50 will not be within the cylindrical bore, nor in fluid communication therewith, when the piston valve body abuts the washer-shaped sealing shoulder 40. Accordingly, flow will be stopped. That is, a seating area 60 on the piston valve body 46 (indicated in FIG. 5 as the area lying within the dashed circle referenced by numeral 60) is not a suitable location for placement of the exit mouth of a flow channel 50.

As seen in FIGS. 1 and 2, the piston valve body 46 is shown installed in the cylindrical valve chamber 32 of the valve housing 25. Such installation is made possible by removal of threaded inlet coupler 28 which provides access to the cylindrical valve chamber 32. The inlet coupler 28 also provides a shoulder 52 (best seen in FIG. 2) that serves as stop means for limiting the backward motion of the piston valve body 46. FIG. 1 illustrates the manner in which the inlet coupler 28 limits the range of motion of the piston valve body 46 whenever said valve body enters into abutment therewith.

A coil spring 54 is used to bias the piston valve body 46 away from the washer-shaped sealing shoulder 40, thereby creating a flow path through the three flow channels 50 in the piston valve body, around the conical nose end 48 of the piston valve body, and through the outlet port 24. The helical-shaped spring 54 preferably should be comprised of Ph13-8Mo material in heat treated condition RH-900, as for example, that produced by Carpenter Steel in Baltimore, Md. The spring 54 should preferably be electro-polished and corrosion resistance for superior service. The load and size of the spring is preselected to accommodate any desirable flow range within which the shut-off valve 20 is to be operative. The spring 54 is in compression and is formed from a continuous wire length helically wound into a plurality of convolutions. One end of the spring 54 is retained within the cylindrical bore 30, and the other end of the spring 54 fits over the nose portion 48 of the piston valve body 46. The backward movement of the piston valve body 46 is limited by stop means defined by the inlet coupler 28.

During normal circumstances, fluid will flow into the safety shut-off device 20 through the main inlet port 22, will flow through the cylindrical chamber 32, through the flow channels 50 in the piston valve body 46, around the nose end 48 of the piston valve body and past the washer-shaped sealing shoulder 40, into the cylindrical bore 30, and out of the safety flow control device 20 through the main outlet port 24. From the main outlet 24, fluid flows back into the mainstream line of the flow system.

The fluid pressure and flow are balanced by the pressure of the spring 54 to keep the flow path open. Normally, the flow channels 50 through the piston valve body 46 are sufficient to handle normal flow. When a downstream problem lessens the resistance to flow (e.g. broken pipe), more fluid will be available to flow through the cylindrical valve chamber 32 because the upstream flow actuator or pump is pumping at the same power level, only with less resistance. If fluid flow through the safety flow control device 20 becomes excessive, the piston flow channels 50 will be insufficient to handle the excess flow and the fluid not travelling through the flow channels 50 will, instead, act upon the rear face (FIG. 4) of the piston valve body 46, thereby increasing pressure thereon. This increased pressure against the piston valve body 46 (exerted by fluid pushing against the rear face of the piston as shown by arrows in FIG. 2), will overcome the pressure of the spring 54 and will force the conical nose 48 of the piston valve body 46 into contact with the washer-shaped sealing shoulder 40, such that the piston sealing area 60 is blocking the cylindrical bore 30 and the outlet port 24 and stopping flow through the safety shut-off device 20. The tapered nose 48 (preferably conical) of the piston valve body seats in a manner that produces a relatively gradual flow change (as opposed to an abrupt shock-inducing change from fully open to fully closed); as the piston moves toward the closed position of FIG. 2, the resistance to flow past the washer shaped sealing shoulder 40 gradually increases until complete shut-off is achieved.

It will be appreciated by those skilled in the art that in the event of a break or serious leak in a hydraulic line downstream from the safety shut-off valve 20 of the present invention, the piston valve body 46 will move into contact with the washer-shaped sealing shoulder 40 to stop flow through the flow control device 20. Hydraulic flow in this particular branch of the system is therefore precluded, and the remaining portions of the system are free to work in a normal fashion. Advantageously, the only moving parts along the flow pathway are the piston valve body 46 and the spring 54.

By varying the relative size of the piston valve body 46, the size and number of the flow channels 50 (and thus the flow area therethrough) in the piston valve body, and the force of the spring, the operating characteristics of the safety shut-off valve 20 may be varied. If desired, the position of the spring 54 may also be chosen to select the force exerted by the spring on the piston valve body 46. The ability to dictate the pressure rating of the shut-off valve 20 by carefully selecting a desired piston size, arrangement and sizes of the flow channels, and spring constant advantageously allows one to manufacture the invention such that the shut-off valve is adapted to effect flow shut-off at a predictable, predetermined pressure level that is preselected during fabrication of the flow control device. This is an improvement over those prior art flow control inventions which typically effect flow shut-off in response to a pressure change rather than in response to the realization of a predetermined pressure level.

Since this preselected pressure that induces shut-off action by the piston valve body is dictated by selectable and quantifiable factors such as the size and number of flow channels, the inside diameter of the normal flow passageways of the flow system, the spring constant and the piston size, and by the inter-relationships between these factors, it will be apparent to those skilled in the art as to how these factors can be adjusted to achieve a desired pressure rating for the invention. For example, if one wishes to adjust the shut-off valve 20 for a quicker flow stoppage wherein shut-off occurs at a lower pressure, less flow channels 50 should be provided in the piston valve body. Conversely, if one wishes to have shut-off executed at a higher pressure, one should increase the number of flow channels 50. In some cases, experimentation will facilitate the making of precision fine-tuning adjustments to the manufacturing specifications of the shut-off valve in order to fabricate a valve having the sought-after pressure rating. The important point is that once a set of manufacturing specifications have been correlated to match the achievement of a certain pressure rating, one can then mass produce the shut-off valve 20 confident that the device will reliably, predictably effect flow stoppage at the preselected predetermined pressure rating that the invention was built for. One constraint on the potential variance in the size and number of the flow channels 50 is that there must be a sufficient number of channels (of sufficient size) to handle normal flow rates in the flow system. It is also important to note that in order for fluid to travel past the piston valve body, said fluid must flow through the flow channels in the piston body, because the piston valve body is of a diameter that fits closely within the cylindrical valve chamber, thereby leaving minimal room for fluid to flow around, rather than through, the piston body.

The present invention has undergone extensive testing and it is worth noting that the shut-off valve 20 was subjected to a pressure test wherein said valve was subjected to 4500 pounds per square inch (p.s.i.) for one hour without leaking. In another pressure test, the invention was subjected to 7500 p.s.i. without bursting. Normal operational criteria for the shut-off valve 20 includes a typical working pressure of 3000 p.s.i., a 50 p.s.i. maximum pressure drop after the valve, and a 9 gallon per minute flow rate therethrough.

This device, although usable in pneumatic applications, and operative and applicable to any kind of pipe line used in directing the flow of gas, oil, or other liquids, is especially geared towards use in hydraulic systems because of its safety value.

From the foregoing, it will be appreciated that the precision safety shut-off valve of the present invention advantageously is responsive to abnormal hydraulic flow to prevent disablement of the entire hydraulic system, when employed in this context. Moreover, the present invention allows the selection of a designated shut-off pressure during manufacturing of the valve and then, in use, will reliably effect closure only when the preselected pressure acts upon the rear face of the piston valve body. Further, the inventive flow control device is economical to manufacture, advantageously includes only two moving parts (piston and spring) within the flow stream, and is extremely simple to install at any point in-line. Yet another desirable feature of the present invention is that once flow stoppage has been effected, the shut-off valve will remain closed until the downstream problem can be fixed. A further advantage is that the inventive shut-off valve utilizes a seating action executed by a conical piston body such that flow changes from full flow to zero flow (and vice versa) are not executed so abruptly as to send a destructive shockwave through the flow system. For example, as the piston body unseats, flow is gradually restored to a maximum level because the removal of the tapered nose of the piston body from its seat will gradually open up the flow port defined by the valve seat. Finally, the problems previously associated with many prior art devices are substantially, if not completely, eliminated.

Although an exemplary embodiment of the present invention has been shown and described, it will be apparent to those having skill in the art that a number of changes, modifications, or alterations to the invention as described herein may be made, none of which depart from the spirit of the invention. For example, the interior of a rear portion of the piston valve body can be hollowed out with the flow channels (if apertures) being in fluid communication with the hollow interior. In this embodiment, the rear face of the piston body (FIG. 4) which is acted upon by excess flow would then lie within the hollow portion of the piston body and entranceways to the flow channels would also lie within said hollow portion. Accordingly, it is not intended that the invention be limited, except as by the appended claims.

I claim:

1. A flow control device for stopping the flow of fluid therethrough when there is a break or leak in the flow path downstream of said device, comprising:
 a housing having a first end and a second end;
 an inlet port located in said first end of said housing for admitting fluid to said housing, said inlet port having a cross-sectional area;
 an outlet port located in said second end of said housing for discharging fluid from said housing, said outlet port having a cross-sectional area;
 a cylindrical valve chamber located in said housing, wherein said cylindrical valve chamber comprises an aperture provided in said housing such that said aperture extends from said first end of said housing toward said second end of said housing, said cylindrical valve chamber having a first end and a second end, said first end of said cylindrical valve chamber being in fluid communication with said fluid inlet port and said second end of said cylindrical valve chamber being in fluid communication with said outlet port;

a washer-shaped sealing shoulder located at said second end of said cylindrical valve chamber;

a piston valve body located for reciprocating movement in said cylindrical valve chamber, said piston valve body having a plurality of longitudinally extending flow channels therethrough, said flow channels being oriented substantially parallel to the direction of said flow path, each of said flow channels having an inlet with a cross-section and an outlet with a cross-section, a sum taken of said inlet cross-sections being greater than said cross-section of said inlet port, a sum taken of said outlet cross-sections being greater than said cross-section of said outlet port, said second end of said cylindrical valve chamber being blocked by said piston valve body when said body abuts said washer-shaped shoulder; and means for biasing said piston valve body away from said washer-shaped shoulder, said biasing means thereby allowing fluid entering said first end of said cylindrical valve chamber to flow through said flow channels in said piston valve body and out said second end of said cylindrical valve chamber, said piston body overcoming the biasing of said biasing means to move gradually into contact with said washer-shaped shoulder thereby sealing said cylindrical valve chamber from being in fluid communication with said outlet port with a minimum of shock, when a break or leak in the flow path occurs downstream of said device;

wherein said piston valve body comprises a cylindrical element having a conical nose portion extending from a first end thereof, said conical nose portion providing a seating area that blocks said second end of said cylindrical valve chamber when said piston valve body abuts said washer-shaped shoulder, and wherein said seating area comprises a continuous tapered surface that is devoid of flow channels.

2. A flow control device as set forth in claim 1, wherein said sum of said flow channel inlet cross sections is at least ten percent more than said cross-sectional area of said inlet port.

3. A flow control device as set forth in claim 1, wherein said sum of said flow channel outlet cross sections is at least ten percent more that said cross-sectional area of said outlet port.

4. A flow control device as set forth in claim 1, wherein said piston valve body includes a rear face at a second end that is opposite the conical nose portion, wherein said biasing means exerts a biasing force against said conical nose portion of the piston valve body, and wherein said biasing means does not act upon or contact said rear face of the piston valve body.

5. A flow control device as set forth in claim 4, wherein said housing further includes a cylindrical bore that is coaxial with said cylindrical valve chamber, said cylindrical bore extending between, and being in fluid communication with, said second end of the cylindrical valve chamber and said outlet port, wherein said biasing means comprises a spring having one spring end seated against the conical nose portion of the piston valve body and having a second spring end that is retained within said cylindrical bore.

6. A flow control device as set forth in claim 5, wherein said cylindrical bore is smaller in diameter than said cylindrical valve chamber.

7. A flow control device as set forth in claim 1, wherein said flow channels comprise three apertures equidistantly spaced around the circumference of said cylindrical element.

8. A flow control device as set forth in claim 1, wherein said washer-shaped shoulder presents a relatively flat smooth surface that is oriented substantially perpendicular to the direction of the flow path;

wherein as said piston body moves into contact with said washer-shaped shoulder, said tapered surface of said seating area of the piston body and said washer-shaped shoulder cooperate to gradually reduce flow through said device until flow shutoff occurs by cooperatively defining a flow passageway through the second end of the cylindrical valve chamber, wherein said flow passageway gradually decreases in size as said piston body moves its seating area into abutment with the washer shaped shoulder; and wherein as said piston body moves out of contact with said washer-shaped shoulder, following a flow shut-off, said tapered surface of the seating area of the piston body and said washer-shaped shoulder cooperate to gradually increase flow from zero flow to full flow by cooperatively defining a flow passageway through the second end of the cylindrical valve chamber, wherein said flow passageway gradually increases in size as said piston body moves its seating area out of abutment with the washer-shaped shoulder.

9. A flow control device for stopping the flow of fluid therethrough when there is a break or leak in the flow path downstream of said device, comprising:

a housing having a first end and a second end;

an inlet port located in said first end of said housing for admitting fluid to said housing, said inlet port having a cross-sectional area;

an outlet port located in said second end of said housing for discharging fluid from said housing, said outlet port having a cross-sectional area;

a cylindrical valve chamber located in said housing, wherein said cylindrical valve chamber comprises an aperture provided in said housing such that said aperture extends from said first end of said housing toward said second end of said housing, said cylindrical valve chamber having a first end and a second end, said first end of said cylindrical valve chamber being in fluid communication with said fluid inlet port and said second end of said cylindrical valve chamber being in fluid communication with said outlet port;

a washer-shaped sealing shoulder located at said second end of said cylindrical valve chamber;

a piston valve body located for reciprocating movement in said cylindrical valve chamber, said piston valve body having a plurality of longitudinally extending apertures therethrough, each aperture having a cross section, said second end of said cylindrical valve chamber being blocked by said piston valve body when said body abuts said washer-shaped shoulder; and means for biasing said piston valve body away from said washer-shaped shoulder, said biasing means thereby allowing fluid entering said first end of said cylindrical valve chamber to flow through said piston apertures and out said second end of said cylindrical valve chamber, said piston body overcoming the biasing of said biasing means to move gradually into contact with said washer-shaped shoulder thereby sealing said cylindrical valve chamber from being in fluid communication with said outlet port, when a break or leak in the flow path occurs downstream of said device;

wherein a sum of said cross sectional areas of all piston apertures is equal to at least ten percent more than said cross sectional area of said inlet port, and wherein said sum of said cross sectional areas of all piston apertures is also equal to at least ten percent more than said cross sectional area of said outlet port.

10. A flow control device as set forth in claim 9, wherein said piston apertures are oriented substantially parallel to the direction of said flow path and said apertures provide linear flow passageways through said piston valve body, said flow passageways being parallel to each other.

11. A flow control device as set forth in claim 9, wherein said piston valve body comprises a cylindrical element having a conical nose segment extending from a first end thereof, said conical nose segment providing a seating area that blocks the second end of said cylindrical valve chamber when said piston valve body abuts said washer-shaped shoulder, and wherein said seating area comprises a continuous tapered surface that is devoid of apertures, said cylindrical element defining a piston diameter, wherein a portion of said conical nose segment defines a largest nose diameter, wherein this nose diameter, at its largest size, is equal to said piston diameter, and wherein the conical nose segment is configured such that the nose segment presents a continuous tapered conical surface that extends between said nose portion of largest diameter and an apex of said nose segment.

12. A flow control device as set forth in claim 9, wherein said washer shaped shoulder includes an insert of hardened material, wherein said hardened insert provides means for strengthening said shoulder against erosion.

13. A flow control device as set forth in claim 9, wherein said piston valve body comprises a cylindrical element having a conical nose segment extending from a first end thereof and having a rear face at a second end thereof, said rear face being oriented substantially perpendicular to the direction of the flow path, said conical nose segment providing a seating area that blocks the second end of said cylindrical valve chamber when said piston valve body abuts said washer-shaped shoulder, said cylindrical element defining a piston diameter, wherein the length of the piston valve body from its first end to its second end defines a piston bearing surface, and wherein the piston bearing surface is of a length that is equal to, or greater than, the piston diameter.

14. A flow control device as set forth in claim 13, wherein said piston bearing surface is of a length that is equal to, or greater than, a minimum of fifty percent more than the piston diameter.

15. A flow control device as set forth in claim 9, further including stop means for limiting movement of the piston valve body in a direction away from the washer-shaped shoulder.

16. A flow control device as set forth in claim 15, wherein said stop means comprises a threaded coupler that is in threaded engagement with the first end of said housing, and wherein said coupler defines, at least in part, said inlet port.

17. A flow control device as set forth in claim 9, wherein said piston valve body comprises a cylindrical element having a conical nose portion extending from a first end thereof, and wherein said device defines a normal flow path wherein fluid enters said housing through said inlet port, passes through the first end of said cylindrical valve chamber to enter said valve chamber, then flows through said piston apertures and around said conical nose portion to pass through the second end of said cylindrical valve chamber, and finally flows through the outlet port to exit the device.

18. A safety shut-off valve for use in hydraulic systems for stopping the flow of fluid therethrough when there is a break or leak in the flow path downstream of said device, consisting of:

a housing having a first end and a second end;

an inlet port located in said first end of said housing for admitting hydraulic fluid to said housing, said inlet port having a cross-sectional area;

an outlet port located in said second end of said housing for discharging fluid from said housing, said outlet port having a cross-sectional area;

a cylindrical valve chamber located in said housing, said cylindrical valve chamber comprising an aperture provided in said housing such that said aperture extends from said first end of said housing toward said second end of said housing, said cylindrical valve chamber having a first end and a second end, said first end of said cylindrical valve chamber being in fluid communication with said fluid inlet port and said second end of said cylindrical valve chamber being in fluid communication with said outlet port;

a washer-shaped sealing shoulder located at said second end of said cylindrical valve chamber;

a piston valve body located for reciprocating movement in said cylindrical valve chamber, said reciprocating action of said piston body being directed along an axis that is parallel to the direction of flow through the valve, said piston valve body having a plurality of longitudinally extending flow channels therethrough, each of said flow channels having an inlet with a cross-section and an outlet with a cross-section, a sum of said inlet cross-sections being greater than said cross-section of said inlet port, a sum of said outlet cross-sections being greater than said cross-section of said outlet port, said second end of said cylindrical valve chamber being blocked by said piston valve body when said body abuts said washer-shaped shoulder; and a coil spring for biasing said piston valve body away from said washer-shaped shoulder, said spring thereby allowing hydraulic fluid entering said first end of said cylindrical valve chamber to flow through said flow channels in said piston valve body and out said second end of said cylindrical valve chamber, said piston body overcoming the biasing of said spring to gradually move into contact with said washer-shaped shoulder thereby sealing said cylindrical valve chamber from being in fluid communication with said outlet port, when a break or leak in the flow path occurs downstream of said device; whereby a break or leak occurring downstream of the safety shut-off valve causes said piston valve body to seal said cylindrical valve chamber gradually and with a minimum of shock.

* * * * *